Sept. 11, 1928.
A. F. MASURY ET AL
1,684,041
VEHICLE SPRING CONSTRUCTION
Filed Oct. 23, 1924   3 Sheets-Sheet 1
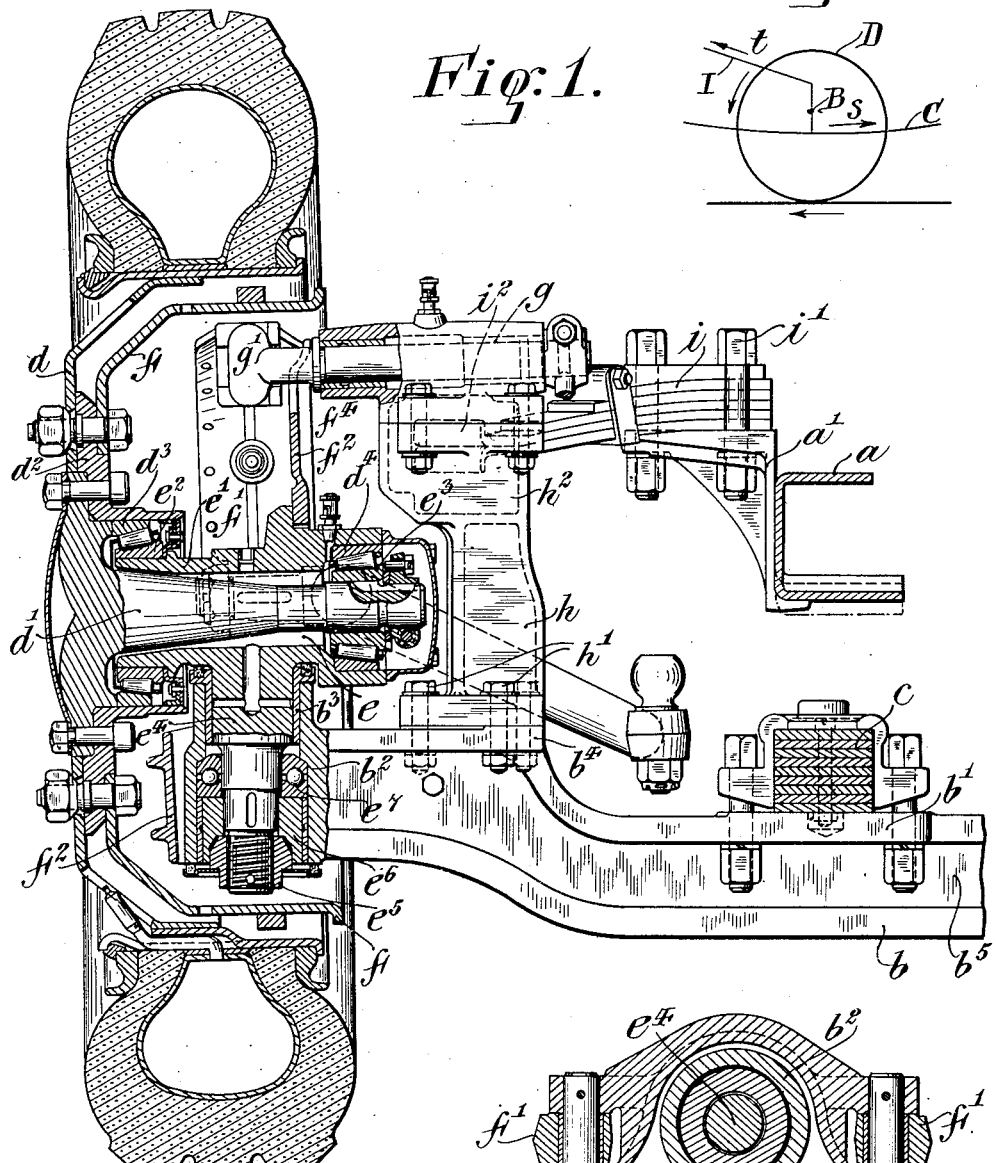
Fig. 1.
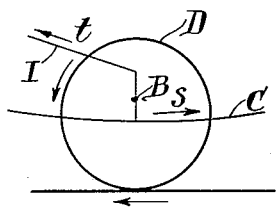
Fig. 12.
Fig. 4.
Fig. 11.
Inventors
Alfred F. Masury and Erving R. Gurney
By their Attorneys
Redding, Greeley, O'Shea and Campbell Sept. 11, 1928.

A. F. MASURY ET AL 1,684,041

VEHICLE SPRING CONSTRUCTION

Filed Oct. 23, 1924       3 Sheets-Sheet 2

Inventors
Alfred F. Masury and Erving R. Gurney
By their Attorneys
Redding, Greeley, O'Shea and Campbell Sept. 11, 1928.

A. F. MASURY ET AL

VEHICLE SPRING CONSTRUCTION

Filed Oct. 23, 1924    3 Sheets-Sheet 3

1,684,041

Inventors
Alfred F. Masury and Erving R. Gurney
By Their Attorneys
Reading, Greeley, O'Shea and Campbell Patented Sept. 11, 1928.

1,684,041

UNITED STATES PATENT OFFICE.

ALFRED F. MASURY, OF NEW YORK, AND ERVING R. GURNEY, OF BEECHHURST, NEW YORK, ASSIGNORS TO INTERNATIONAL MOTOR COMPANY, OF NEW YORK, N. Y., A CORPORATION OF DELAWARE.

VEHICLE-SPRING CONSTRUCTION.

Application filed October 23, 1924. Serial No. 745,291.

This invention relates to a front axle construction for motor vehicles and is particularly designed for motor vehicles intended for heavy duty, such as trucks and busses. In traveling over uneven roadways, such as are usually found without city limits, shocks and stresses are continually being impressed upon the vehicle through the wheels. It is an object of the present invention to provide a front axle structure so designed as to offer suitable reaction against such shocks and stresses both turning and lateral and thus reduce the wear and high replacement costs. To this end the front axle, which is supported by a steering knuckle of improved construction at a point below the wheel center in the interest of stability is provided, at a point above the center of the wheel, with a resilient yielding connection with the vehicle frame. This reacting connection preferably takes the form of a post mounted upon the axle adjacent the steering knuckle and connected at its upper end to what may be termed a stabilizer spring extending forwardly and inwardly to the chassis frame upon either side of the vehicle. Thus, when the vehicle is traveling in a forward direction and the wheel is momentarily retarded by striking an obstruction or inequality in the road, the normal tendency of the axle to turn about the wheel center due to the inertia of the load is opposed in a yielding manner by the stabilizer spring. This stabilizer spring may also serve, in some situations, an additional purpose in overcoming side-sway of the vehicle body, any tendency of the body to move laterally being resisted by the converging springs upon opposite sides thereof.

Another object of the invention is to so shape the axle as to offer the greatest resistance to the shocks and stresses impressed thereon. To this end the axle which is, in general, an I-beam according to accepted automotive practice is inclined throughout the major portion of its length at an angle with the vertical. More particularly, the web is inclined downwardly and forwardly in about the plane of the resultant of the road shocks impressed upon the front wheels. The invention further resides in the construction and assembly of the various component parts of the axle and wheel which provide a rugged construction and which at the same time is practical from considerations of manufacture and use. In order that the invention may be clearly understood and readily carried into effect the same will now be described more fully in connection with the accompanying drawings illustrating a preferred embodiment thereof and in which:

Figure 1 is a view partly in section and partly in elevation showing one end of the front axle construction according to the present invention looking from the rear and illustrating particularly the stabilizer spring and steering and braking devices incorporated with the axle structure.

Figure 4 is a fragmentary sectional view showing the manner in which brake shoes may be supported from the brake drum housing in the improved construction.

Figure 11 is a diagrammatic view showing the resolution of forces resulting from road shocks impressed upon an axle and usual spring suspension.

Figure 12 is a diagrammatic view showing the resolution of forces resulting from the impression of road shocks upon the axle according to the present invention.

Figure 2:
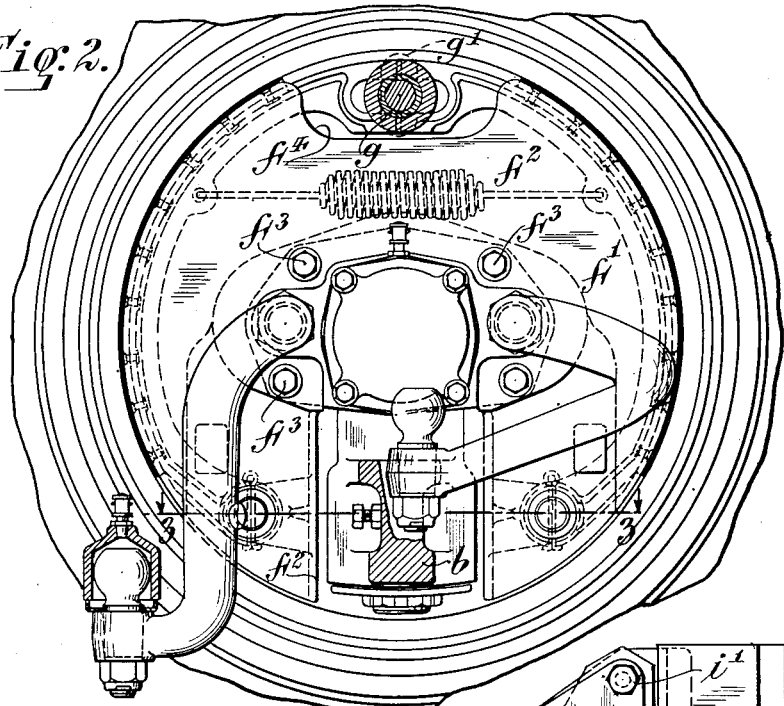
Figure 2 is a fragmentary view looking from the right of the wheel in Figure 1.
Figure 3:
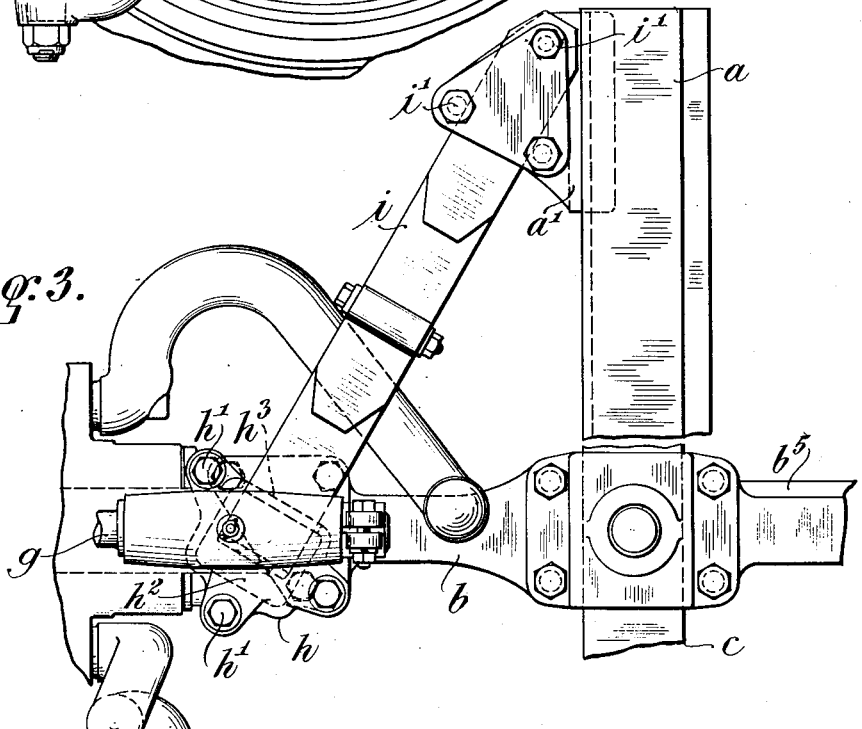
Figure 3 is a fragmentary view looking from above in Figure 1 and showing the arrangement and disposition of the stabilizer springs.
Figure 5:
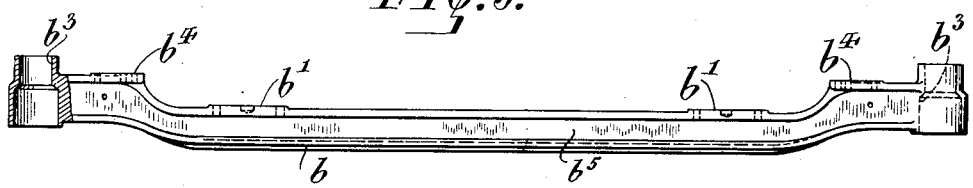
Figure 5 is a view in front elevation of the axle according to the present invention.
Figure 6:
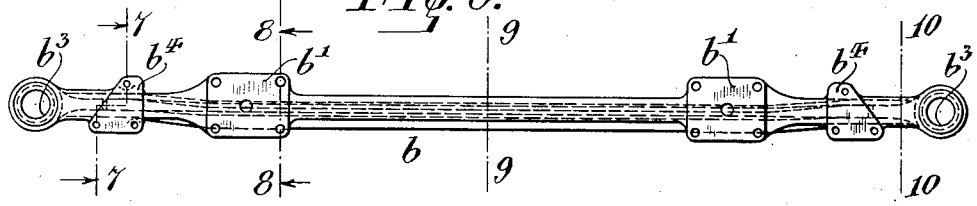
Figure 6 is a view similar to that of Figure 5 but looking from above in that figure.
Figure 7:
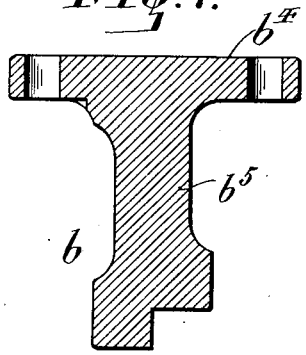
Figure 7 is a view taken in the plane indicated by the line 7—7 in Figure 6 and looking in the direction of the arrows.

Referring to Figure 1 the chassis, a longitudinal side member of which is indicated at $a$ is supported in any convenient manner from the axle $b$. In the illustrated embodiment it is proposed to support the chassis by means of semi-elliptic springs $c$ secured to spring seats $b'$ formed in the upper flange of the axle in a manner well understood. Axle $b$ is supported from the wheels $d$ by a unitary knuckle and knuckle pin construction having certain novel characteristics which contribute to the strength and rigidity of the structure as a whole. The wheel $d$ carries centrally thereof a stub axle $d'$ which is rotatable within a transverse opening $e$ in a unitary knuckle and knuckle pin $e'$. Adjacent the wheel hub $d^2$ the wheel and knuckle are provided with complementary bearing races $d^3$, $e^2$, respectively, which are disposed outwardly of the knuckle $e$ and have between them any convenient type of bearing such as the roller bearing shown in the illustrated embodiment. On the vehicle side of the stub axle the complementary bearing races $d^4$ and $e^3$ are disposed inwardly of knuckle $e$ between the knuckle and the stub axle respectively. A convenient type of lock nut and dust cap has been illustrated on the inner end of the stub axle but since these form no part of the present invention they will not be described. The steering knuckle $e$ is provided with a depending knuckle pin portion $e^4$ unitary therewith. This steering knuckle is seated within a vertically disposed bearing $b^2$ formed in the axle $b$, suitable bushings $b^3$ being provided between the axle and the knuckle pin. Threaded on to the lower end of the knuckle pin is a nut $e^5$ and supported immediately thereabove is a thrust bearing or spacer ring $e^6$. The weight of the axle is supported upon thrust bearing $e^6$ through ball bearing $e^7$ in a manner which will be readily understood from an inspection of Figure 1.

Supported interiorly of the wheel hub $d^2$ is a brake drum $f$. The brake shoes $f'$ bearing upon the interior of the brake drum are supported from a closure or dust cap $f^2$ supported, as by the bolts $f^3$, from the steering knuckle. Thus the brake drum housing performs a dual function; that of protecting the interior of the brake drum from foreign matter and that of a brake spider. At the upper portion of the brake drum the spider is cut away as at $f^4$ to permit the entrance into the interior of the brake drum of the cam shaft $g$ carrying at its inner end the brake shoe actuating cam $g'$.

The bearing for the cam shaft $g$ is formed at the top of a post $h$ secured, as by the bolts $h'$, to a seat $b^4$ formed in the upper flange of the axle. Post $h$ is preferably disposed adjacent the wheel $d$ and has formed in the upper portion thereof a recess $h^2$ having an open side $h^3$ to receive the end of a stabilizer spring $i$. The stabilizer spring $i$ extends forwardly and inwardly from the post $h$ and is rigidly secured at its inner end to the side frame member $a$ of the chassis. Preferably the end of the spring is clamped by means of the bolts $i'$ to a bracket $a'$ carried with side member $a$. Within the recess $h^2$ may be disposed yielding non-metallic material which engages the end of the spring and forms a yielding non-metallic mechanical connection and support therefor. In order to provide a greater bearing surface at the end of the stabilizer spring $i$, its rear end may be formed with a portion of increased superficial area $i^2$ as by bending the ends of proximate leaves away from each other in vertical planes. It is preferred to use rubber as the yielding non-metallic material forming the connection between the end of the stabilizer spring $i$ and the stabilizer post $h$. The rubber may be retained within the recess $h^2$ under compression since by so retaining it, its strength, resiliency and wearing qualities are increased.

While Figure 1 illustrates only one end of the axle and the construction thereof at only one side of the vehicle has been described it will be understood that the steering, braking and stabilizing devices upon both ends of the front axle are alike. It will be observed that a stabilizer spring extending forwardly and inwardly from the axle to the chassis frame is provided upon both sides of the chassis. The springs thus yieldingly oppose movement of the chassis frame in transverse directions and in this way side-sway of the vehicle is, in great measure, retarded.

In Figure 11 there is illustrated diagrammatically a wheel D and the usual spring suspension C of a motor vehicle. When the vehicle traveling toward the left in the direction of the arrow strikes an obstruction, the forward travel of the wheel is interrupted momentarily while the body of the vehicle supported on the spring C continues to travel due to its inertia. This has a tendency to rotate the body about the axle as indicated by the arrow $x$ directed downwardly at the left, or forwardly, of the axle B and the arrow $y$ directed upwardly, at the right, or rearwardly, of the axle B. The couple thus set up naturally gives rise to strains and stresses in the axle and the spring suspension. By adopting the stabilizer spring just described a reaction may be set up against the turning moments shown in Figure 11, and thus relieve the spring connection in great measure of turning moments. The improved construction is diagrammatically illustrated in Figure 12. Assuming the vehicle to travel toward the left: when the wheel D strikes an obstruction the turning moments about the axle are resolved into a force directed rearwardly at the spring C as indicated by the arrow $s$ and a force directed forwardly at the stabilizer spring I as indicated by the arrow $t$. The stabilizer spring thus opposes yieldingly the force $t$ and relieves the spring connection of the stresses which would otherwise be impressed thereon.

Figure 8:
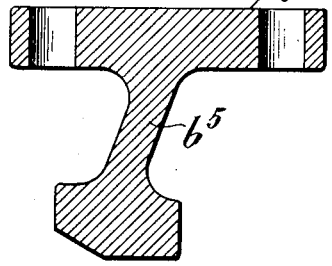
Figure 8 is a view taken in the plane indicated by the line 8—8 in Figure 6, looking in the direction of the arrows and showing the inclination of the axle at that point according to the present invention.
Figure 9:
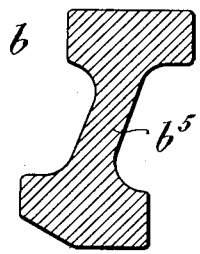
Figure 9 is a view similar to Figure 8 but taken in a plane (9—9 in Figure 6) midway between the ends of the axle.
Figure 10:
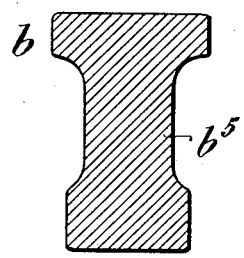
Figure 10 is a sectional view taken in the plane indicated by the line 10—10 in Figure 6.

Referring now to Figures 5 to 10 it will be observed hat the web of the axle, which is formed substantially as an I-beam, is deflected in a plane away from the vertical for a major portion of its length. It is desirable to dispose the web $b^5$ in the plane of the resultant of the road shocks impressed upon the wheels and through them transmitted to the axle, in that, when so disposed, the axle best resists the forces acting thereon. From practical considerations, however, the extremities of the axle lie in vertical planes (see Figures 7 and 10) as will be readily understood. From the region of the stabilizer seats, the web of the axle is sharply inclined forwardly and downwardly as illustrated in Figures 8 and 9.

It will thus be seen that a front axle structure has been provided which is so constructed and arranged as to best withstand the road shocks and stresses impressed thereon. As has been pointed out hereinbefore the tabilizing devices serve not only to counteract the turning moments impressed upon the axle but also serve to retard side-sway of the chassis frame. A further function served by the stabilizer spring post is that of a support for the brake actuating devices contributing in this way to compactness of the assembly.

Various modifications may be made in the construction and assembly of the various component elements of the axle. For instance, the stabilizer spring post and axle may be formed as a single forging instead of an assembly of separate parts as illustrated.

What we claim is:

1. In combination with the chassis frame wheel and spring suspension of a motor vehicle, an axle supported on the wheel below the center thereof and formed rigidly with a housing disposed above the center of the wheel, a resilient element secured to the frame forwardly of the axle and extending rearwardly and outwardly to enter the housing, and yielding non-metallic material contained within the housing and engaging the end of the resilient element.

2. In a motor vehicle, in combination with an axle, chassis frame and spring suspension therebetween, a post mounted rigidly on said axle outwardly of the frame and formed with a forwardly facing recess, a spring secured to the side frame member forwardly of the axle and extending outwardly and rearwardly to enter the recess, and yielding non-metallic material disposed within the recess and engaging the end of the spring.

3. In a motor vehicle having a wheel, an axle and a chassis frame sprung therefrom, said axle being supported from the wheel below the center thereof, a vertical post rigidly mounted on the axle outwardly of the frame, and a resilient stabilizer element secured at one end to the post at a point above the center of the wheel and extending inwardly to the frame and rigidly secured at its other end to the frame.

This specification signed this 21st day of October A. D. 1924.

ALFRED F. MASURY.
ERVING R. GURNEY.